Patented July 15, 1930

1,770,734

UNITED STATES PATENT OFFICE

RUDOLF ENGELHARDT, OF LEVERKUSEN-ON-THE-RHINE, AND WILHELM LOMMEL, OF WIESDORF-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF OLEFINES

No Drawing. Application filed October 3, 1928, Serial No. 310,173, and in Germany March 18, 1924.

The present invention relates to the manufacture of olefines more specifically of ethylene and homologues thereof from the corresponding acid or neutral sulfuric acid alkyl esters.

In accordance with the invention alkylenes can be split off from alkyl sulfates or dialkyl sulfates by reacting upon these sulfates at temperatures between about 150–350° C., and under normal or reduced pressure, in the presence or absence of sulfuric acid, with such a salt of a mono- or poly-basic organic or inorganic acid, as is capable of combining with sulfuric acid, and the reaction product of which with sulfuric acid does not react with alkylenes under the conditions of the process herein described. The best results will be obtained when working with a salt of the kind mentioned in a quantity at least sufficient to bind all of the sulfuric acid present or being liberated during the reaction. Suitable salts for performing the reaction are for instance sodium chloride, sodium acetate, sodium sulfate, ammonium phosphates, neutral or acid calcium phosphates, aluminium sulfate, basic lead acetate, alkali metal salts of naphthalene sulfonic acids, etc. In this manner alkylenes especially ethylene and homologues thereof, such as propylene, are obtainable in a convenient manner and nearly quantitative yield. The process offers great advantages, since for instance ethylene can easily be obtained from ethylene containing gases by passing the latter through concentrated sulfuric acid which will absorb the ethylene with the formation of ethyl and diethyl sulfate, and causing this solution to be reacted upon by a salt of the kind and under the conditions above referred to.

The following examples illustrate our invention, without limiting it thereto:—

*Example 1.*—1 part by volume of a mixture consisting of 17% sulfuric acid, 48% of mono ethyl sulfuric acid and 35% of diethyl sulfate, corresponding to 240 parts by volume of ethylene, is added to an excess of phosphorite heated to 250–300° C. 90% of the combined ethylene is obtained as pure gas. In this process the tricalcium phosphate is decomposed and superphosphate is obtained as a valuable by-product.

*Example 2.*—1 part by volume of ethyl sulfuric acid, corresponding to 150 parts by volume of gaseous ethylene is dropped on to an excess of sodium sulfate at 300° C. 142 parts by volume of ethylene are thereby evolved.

*Example 3.*—1 part by volume of propyl sulfuric acid, corresponding to 198 parts by volume of propylene yields on decomposition with an excess of primary or secondary sodium phosphate 220 parts by volume of a gas containing 89.4% of propylene. On washing with water 196.6 parts by volume of 100% propylene are obtained. Yield equals 99.3%.

*Example 4.*—40 parts by volume of ethyl sulfuric acid, corresponding to 6500 parts by volume of gaseous ethylene are introduced from below upwards into an excess of sodium chloride at 300° C. The gas evolved is washed with water. In this manner about 5000 parts by volume of ethylene are obtained.

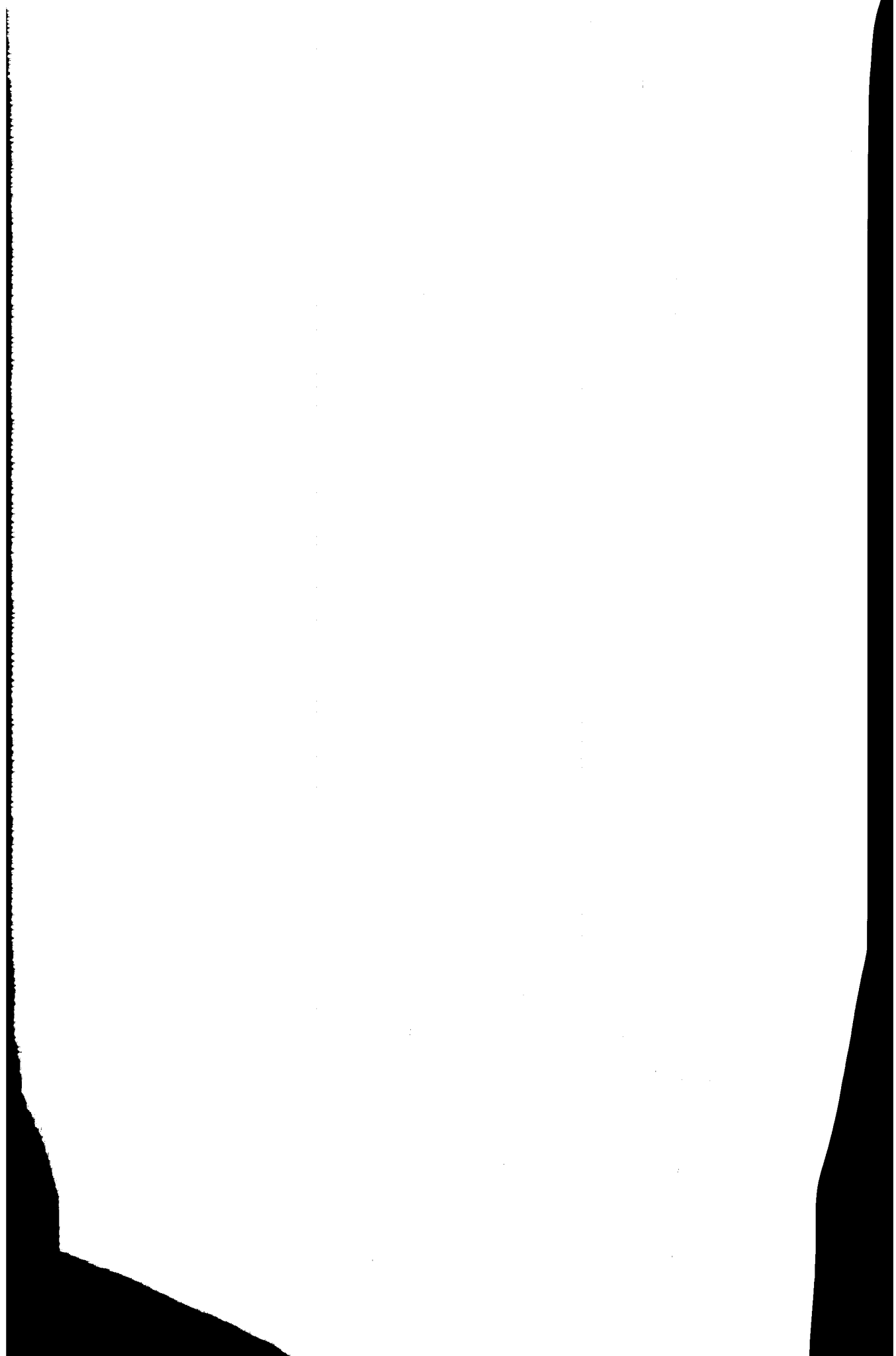

We claim:

1. Process which comprises reacting upon an alkylsulfuric acid ester at a temperature between about 150–350° C. with a compound of the group comprising such salts of acids as are capable of binding sulfuric acid and the reaction products of which with sulfuric acid do not react with alkylenes under the conditions of the process herein described.

2. Process which comprises reacting upon ethyl sulfuric acid ester at a temperature between about 150–350° C. with a compound of the group comprising such salts of acids as are capable of binding sulfuric acid and the reaction products of which with sulfuric acid do not react with alkylenes under the conditions of the process herein described.

3. Process which comprises reacting upon an alkyl sulfuric acid ester at a temperature between about 150–350° C. with phosphorite.

4. Process which comprises reacting upon ethyl sulfuric acid ester at a temperature between about 150–350° C. with phosphorite.

5. Process which comprises reacting upon ethyl sulfuric acid ester, in the presence of